United States Patent [19]
Stern et al.

[11] Patent Number: 5,216,259
[45] Date of Patent: Jun. 1, 1993

[54] APPARATUS AND METHOD FOR IMPROVED DETERMINATION OF THE SPATIAL LOCATION OF OBJECT SURFACE POINTS

[75] Inventors: Howard K. Stern, Greenlawn; Stanley Elstein, Plainview, both of N.Y.

[73] Assignee: Robotic Vision System, Inc., Hauppauge, N.Y.

[21] Appl. No.: 698,133

[22] Filed: May 10, 1991

[51] Int. Cl.$^5$ .................................. G01N 21/86
[52] U.S. Cl. ............................ 250/561; 356/5
[58] Field of Search .............. 250/560, 561, 213 VT; 356/1, 4, 5, 152, 376, 141

[56] References Cited

U.S. PATENT DOCUMENTS

| | | | |
|---|---|---|---|
| 3,495,087 | 2/1970 | Starer | 250/213 VT |
| 3,682,553 | 8/1972 | Kapany | 356/5 |
| 3,743,419 | 4/1973 | Skagerlund | 356/5 |
| 4,129,780 | 12/1978 | Laughlin | 356/5 |
| 4,199,253 | 4/1980 | Ross | 356/5 |
| 4,259,017 | 3/1981 | Ross et al. | 356/376 |
| 4,634,272 | 1/1987 | Endo | 356/152 |
| 4,854,698 | 8/1989 | Schmidt | 356/5 |
| 4,935,616 | 6/1990 | Scott | 250/213 VT |

Primary Examiner—David C. Nelms
Assistant Examiner—S. Allen
Attorney, Agent, or Firm—Robin, Blecker, Daley & Driscoll

[57] ABSTRACT

Apparatus and method for use in determining the location of object surface points wherein a short pulse of optical energy is projected at the object surface and a time dependent gain function is used to modify the reflected optical energy resulting from the pulse so that time delay information indicative range can be developed and processed.

57 Claims, 8 Drawing Sheets

APPARATUS AND METHOD FOR IMPROVED DETERMINATION OF THE SPATIAL LOCATION OF OBJECT SURFACE POINTS

BACKGROUND OF THE INVENTION

This invention relates to methods and apparatus for use in determining the spatial location of the points on an object surface and, in particular, to an improved method and apparatus of this type.

A variety of different types of systems have been used to determine the spatial location of the points on an object surface. One type of system is disclosed in U.S. Pat. Nos. 4,199,253 and 4,854,698, assigned to the assignee hereof, and the teachings of which are incorporated herein by reference.

In the system of the '253 patent, optical energy is first projected at the object surface. The object surface then reflects certain of the projected optical energy and the reflected optical energy is collected by a receiver. At the receiver, the time delay of receipt of each of a number of individual parts of the received reflected optical energy is determined. This time delay is indicative of the outward distance (i.e., the so-called "range") of the surface point corresponding to the particular received energy part. The time delay information along with other two-dimensional information contained in the received optical energy and with the position of the lens node of the receiver are then used to locate surface points in three dimensions using standard triangulation processing.

In the '253 patent system, time delay information is developed by using different preselected time dependent gating functions to gate a shutter means in the receiver. These time dependent gating functions together encode the object surface points into corresponding time delay intervals. As a result, the presence or absence of an individual optical energy part in the reflected optical energy received during the different gating functions provides a code from which the time delay interval for the surface point corresponding to the optical energy part can be determined.

The '253 patent further contemplates the use of multiple receiver channels and a single projected pulse as one mechanism for subjecting received optical energy to the different gating functions. Also contemplated is a second mechanism in which a succession of optical pulses are transmitted over a single channel and the different gating functions are applied to the resultant succession of optical signals received over the single channel.

The ability of the digital type of system disclosed in the '253 patent to provide fine spatial resolution of the object surface points requires the use of a large number of channels or a large succession of pulses and complex circuitry for generating the gating functions. This has prompted continued efforts to design systems for surface point determination which are less complex.

One such system is disclosed in U.S. Pat. No. 4,935,616, the teachings of which are also incorporated herein by reference. The system of the '616 patent is an analog type system in which a continuously and sinsusoidally modulated optical laser beam is projected at an object surface. The optical energy reflected from the surface is then received in a receiver designed to determine the phase shift of the received energy parts relative to a reference signal. The measured phase shift then serves as an indication of the range of the energy part and, therefore, its corresponding surface point.

In the receiver of the '616 patent, the received optical energy first undergoes conversion to an electron beam. During this conversion the energy is modulated by a sinsusoidal signal at the same frequency as the original modulation frequency of the projected signal. The modulated electrical signal is then converted back to an optical signal and the resultant optical signal conveyed to an array detector. Each cell of the latter detector averages over time the intensity of a corresponding part of the received optical signal to provide a measure of the energy and, hence, the phase-shift of the signal part. The measured phase-shift then serves as an indication of the range of the corresponding surface point.

The '616 patent mentions that in order to provide more reliable and broader range detection, multiple measurements can be made, one measurement using a cosine modulation function and the other a sine modulation function at the receiver. This increases the so-called "ambiguity range", i.e., the distance before which an ambiguity arises because of a repeat in the modulation values, to a full 360° in phase angle corresponding to a distance of one-half of the modulation frequency. It also enhances measurements where the cosine function changes slowly, and, therefore, loses accuracy.

Additionally, the '616 patent also mentions that greater immunity to noise can be realized by making measurements at two frequencies which are different integer multiples of the same common frequency. In this case, processing can be carried out such that a long ambiguity interval characteristic of the lower common frequency is realized, while good range resolution characteristic of the higher integer multiple frequency is also realized.

While the system of the '616 patent can provide range resolution equal to that of the above-discussed digital system, the need to provide continuous optical laser illumination has undesirable consequences. First, it makes the system sensitive to relative motion between the system components and the object surface. This motion sensitivity can lead to erroneous and less reliable range determinations. Also, the laser power used must be relatively low in order to preserve the integrity of the object surface during continuous illumination. This makes the system more susceptible to background illumination and other noise sources. Additionally, the system is not readily adaptable to multiple channel use.

It is, therefore, an object of the present invention to provide an improved apparatus and method for use in determining the spatial location of the points on an object surface.

It is a further object of the present invention to provide an improved apparatus and method as mentioned in the previous objective and which are less susceptible to relative motion between the apparatus and object surface point and to background noise and which provide high range resolution.

SUMMARY OF THE INVENTION

In accordance with the principles of the present invention, the above and other objectives are realized in an apparatus and method in which a short pulse of optical energy is projected at an object surface. The optical energy reflected from the object surface as a result of the short optical pulse is subsequently received and collected. The received optical energy is thereafter modified or changed based upon a time dependent gain function. Processing of the modified received optical energy is then carried out to develop a measure of the gain value or factor applied to each of individual parts of the optical energy. Each g in factor is indicative of the time delay and, therefore, range of the object surface point corresponding to the individual energy part and, along with other information, can be used to determine the three dimensional spatial location of such surface point.

In further practice under the invention, different time dependent gain functions are used to modify the received optical energy in different receiving channels resulting from a single optical pulse or in a succession of received optical energy signals in a single receiving channel resulting from a succession of optical pulses. The modified received optical energy in the different channels or in the succession of received optical energy signals is then processed to assess the gain factors applied to the individual optical energy parts. The determined gain factors for corresponding individual optical energy parts are then used to determine the spatial location of the surface point associated with the energy parts.

In yet a further aspect of the invention, the received optical energy is subjected to different time dependent gating functions as in the the '253 patent and the gated energy is also used in the processing for surface point determination. The aforesaid gating functions can be applied to entirely separately received optical energy or can be applied to the received optical energy to which the time dependent gain functions are applied individually or as a composite functions with the gain functions.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
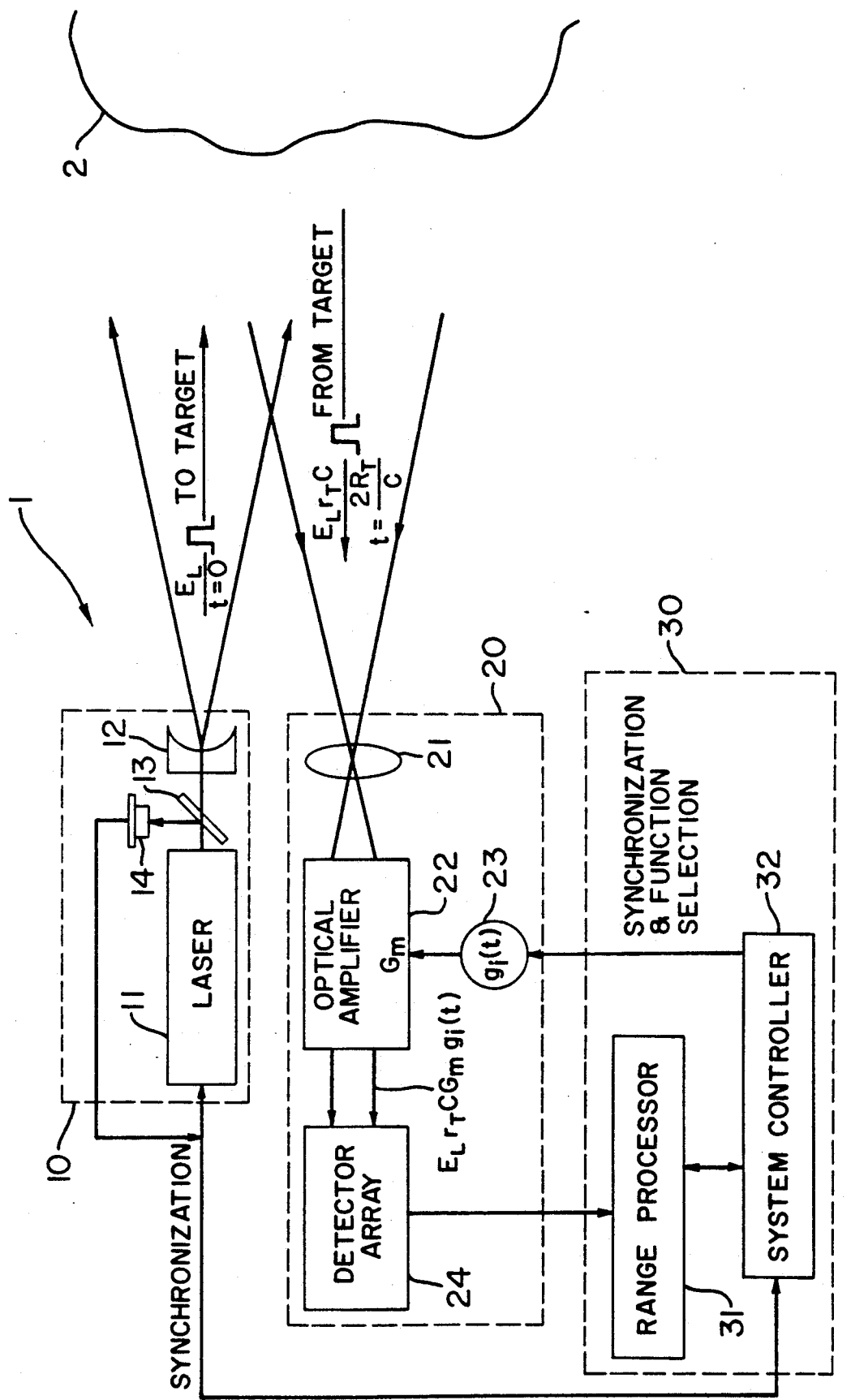
FIG. 1 illustrates a system for object point determination in accordance with the principles of the present invention.

FIG. 1 shows a system 1 for determining the spatial location of the points on an object surface or target 2. As shown, the system comprises a projection unit 10, a receiving unit 20 and a processing and control unit 30.

The projection unit 10 includes a source of optical energy, shown a laser 11, followed by projection optics 12. These components together project an optical beam or signal of energy $E_L$ onto the surface area of interest of the object or target 2. The target surface reflects a portion of the projected optical energy to produce a reflected beam or signal of optical intensity $S_T$ and whose energy content $E_T$ depends upon the reflectivity $r_T$ of the target as well as a constant C. The constant C accounts for the relative area of the projected optical signal encountered by the surface of the target, the range or distance to the target, atmospheric attenuation along the path of the projected and reflected optical signals and any other factors which may effect the amplitude of the reflected signal. Thus, $E_T$ can be expressed as follows:

$$E_T = E_L r_T C$$

The reflected optical signal $S_T$ is collected by the receiver section 20 via a collecting lens 21 and passed through an optical amplifier 22 to a detector array 24. The elements of the latter array provide electrical signals which are a measure of the energy in different individual parts of the reflected optical signal $S_T$. Each of these parts corresponds to an object surface point which gave rise to the particular signal part.

The output electrical signals from the detector array elements are then conveyed to the processor and control unit 30. The unit 30 includes a range processor 31 which, under the control of a system controller 32, utilizes the output signals of the array to determine the distance or range to the corresponding surface points of the target. The processor 31 can then use this range information with two dimensional spatial information (based on the detector array elements) and with the node information of the collecting lens 21 to determine the three-dimensional position of the target surface points. This can be accomplished using conventional triangulation techniques as described in the '253 patent.

In accordance with the principles of the present invention, the system 1 is further adapted such that the aforesaid range and spatial determinations can be accomplished with limited disturbance both from noise and from relative movement between the system components and the target 2. The system adaptation is also such that a relatively high resolution is still achieved. In particular, these results are realized in accord with the invention by utilizing a short pulse of optical energy for the projected optical signal and by making range determinations based upon analog measurement of the time delay of receipt of the reflected optical energy resulting from the projected optical pulse.

Analog measurement of this time delay is realized in the system 1 by utilizing a variable gain optical amplifier for the amplifier 22 and by varying the maximum gain $G_m$ of the amplifier 22 based upon a time dependent gain function g(t). The function g(t), in turn, is generated by a gain function generator 23 in response to instructions from the controller 32. The controller 32 may also provide instructions to the optical source 11 so as to establish desired synchronization between the signal g(t) and the projected optical pulse. Alternatively, synchronization may be provided by the optical source 11 via supplying the controller 32 with a synchronization signal developed by a photodetector 14 which receives a sample of the projected pulse from a beam splitter 13.

The use of the variable gain function g(t) to vary the gain of the optical amplifier 22 causes the amplifier to modify or alter the received optical signal $S_T$ so that the signal is now dependent upon a gain factor $g(t_T)$ which is a measure of the time delay $t_T$ in receiving the received optical signal relative to the time of projection of the associated optical pulse signal. Thus, the modified optical signal $S'_T$ can be expressed as $$S'_T = E_L r_T C \; G_m \, g(t_T) \qquad 10$$

As above-indicated, each element of the detector array 24 develops an electrical signal corresponding to the energy in an individual part of the optical signal $S_T'$. As a result, each electrical signal contains the gain factor $g(t_T)$ for the associated energy part.

The range processor 31 thus receives from the detector array 24 electrical signals having gain factors for the received energy parts and from which the corresponding delay times $t_T$ can be extracted. The processor thus performs an extraction procedure to retrieve the delay times and from the delay times calculates the ranges $R_T$ to the corresponding target points using the well known range formula $$R_T = \frac{c t_T}{2}$$

where c is the velocity of light.

In order for the range processor 31 to be able to successfully perform this extraction, it is preferable that two optical signals $S'_{1,T}$ and $S'_{2,T}$ be compared during processing, each signal having been developed by subjecting respective received signals $S_{1,T}$ and $S_{2,T}$ to different gain functions $g_1(t)$ and $g_2(t)$. This can be accomplished by using an additional receiver 20', operating as a parallel receiving channel with the receiving channel of the receiver 20, to produce the signals $S'_{1,T}$ and $S'_{2,T}$ from the reflected energy of a single projected pulse. In such case, the receiver 20' would have the same configuration as the receiver 20, but would be controlled by the system controller 32 to provide a gain function $g_2(t)$ to its received optical signal. The receiver 20, in turn, would be controlled by the controller to provide the other gain function $g_1(t)$ to its received energy.

Alternatively, the different signals $S_{1,T}$, $S_{2,T}$ and $S'_{1,T}$ and $S'_{2,T}$ can both be developed by the single receiver 20 by adapting the system 1 to project a succession of short pulses. In this case, during receipt of the reflected energy signal from a first pulse, the receiver 20 would be controlled to provide the first gain function $g_1(t)$ and during receipt of the reflected energy from a second pulse, the receiver 20 would be controlled to provide the second gain function $g_2(t)$.

Figure 2A:
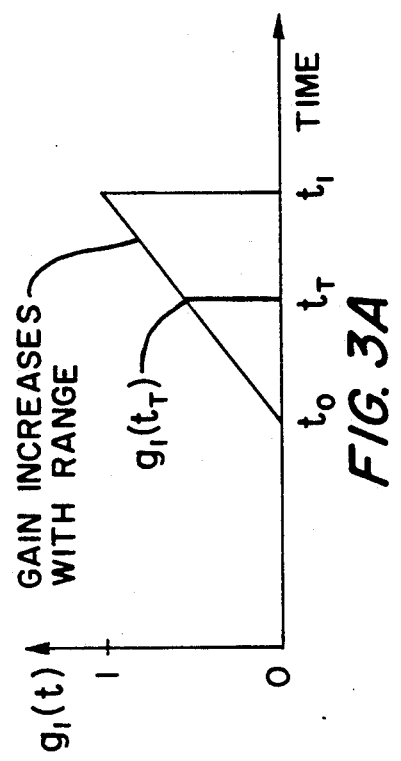
FIGS. 2A and 2B illustrate a first set of nonperiodic analog waveforms which can be used to provide time dependent gain functions in the system of FIG. 1.
Figure 2B:
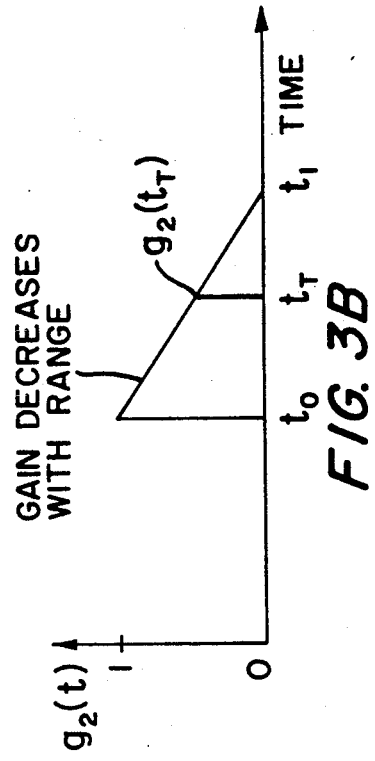

FIGS. 2A and 2B illustrate representative gain functions which can be used for the functions $g_1(t)$ and $g_2(t)$. As shown, $g_1(t)$ is a linear, monotonic function, while $g_2(t)$ is a constant gain function equal to 1 when $g_1(t)$ is other than zero. Since $g_1(t)$ is linear, $t_T$ for this case can be shown to be given as $$t_T = g_1^{-1} \frac{(S'_{1,T})}{(S'_{2,T})}$$

For the specific situation of $g_1(t)$ being a ramp function then $$g_1(t) = \begin{cases} 0 & t < t_0, \; t_1 < t \\ \dfrac{t - t_0}{t_1 - t_0} & t_0 \leq t \leq t_1 \end{cases}$$

and $$g_1^{-1}(x) = t_0 + x \, (t_1 - t_0)$$

Figure 3A:
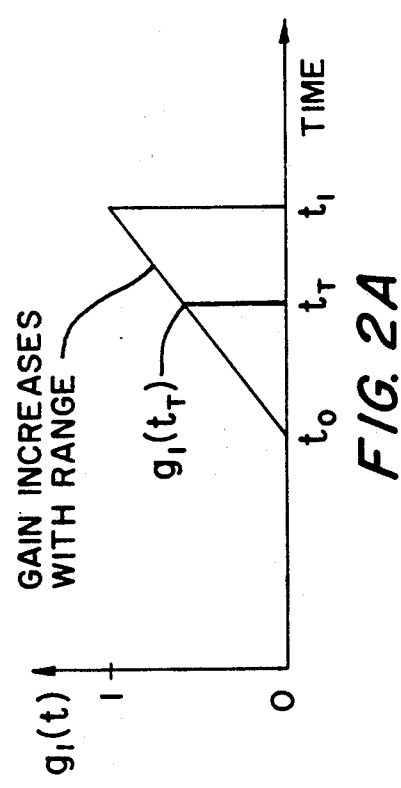
FIGS. 3A and 3B illustrate a second set of nonperiodic analog waveforms which can be used to provide time dependent gain functions in the system of FIG. 1.
Figure 3B:
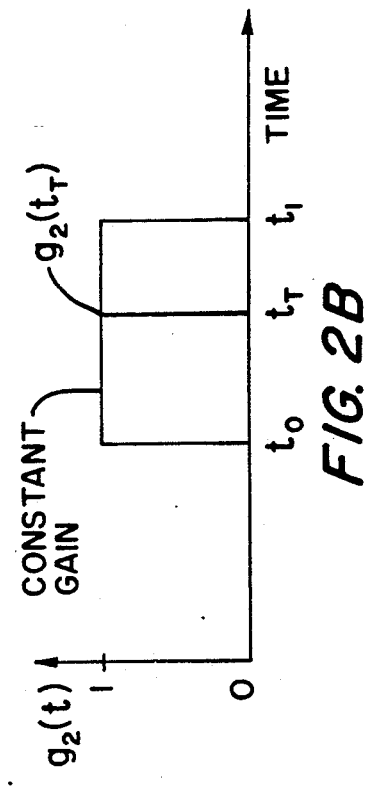

While the use of the gain functions in FIGS. 2A and 2B provides a simple way to generate the the optical signals $S_{1,T}$, $S_{2,T}$ and $S'_{1,T}$ and $S'_{2,T}$ for use by processor 31 to retrieve the delay times $t_T$, preferable functions are functions which are complementary to one another, i.e., which have an inverse relationship. Thus, if $g_1(t)$ is a ramp function as shown in FIG. 3A (the ramp function of FIG. 3A is the same as the ramp function of FIG. 2A), then a preferable form for the function $g_2(t)$ is an inverse ramp function as shown in FIG. 3(B). The function $g_2(t)$ in FIG. 3B can be is expressed as follows:

$$g_2(t) = \begin{cases} 0 & t < t_0, \; t_1 < t \\ \dfrac{t_1 - t}{t_1 - t_0} & t_0 \leq t \leq t_1 \end{cases}$$

In this case, it can be shown that the value of the time delay $t_T$ in terms of the modified received optical signals $S'_{1,T}$, $S'_{2,T}$ is as follows $$t_T = t_0 + \left[ 1 + \frac{S'_{1,T} - S'_{2,T}}{S'_{1,T} + S'_{2,T}} \right] \frac{t_1 - t_0}{2}$$

which is based on the following relationship $$\frac{S'_{1,T} - S'_{2,T}}{S'_{1,T} + S'_{2,T}} = \frac{g_1(t) - g_2(t)}{g_1(t) + g_2(t)} = g_1(t) - g_2(t) = \frac{2t - t_1 - t_0}{t_1 - t_0}$$

The ability of the system 1 to resolve various time delays $t_T$ and thus corresponding ranges $R_T$ one from the other using two different time dependent gain functions as above-described is limited by the available signal-to-noise ratio of the system. The number of discrete ranges that can be resolved, furthermore, is fairly independent of the duration of the gain functions used. Thus, a short duration gain function can provide a fine range resolution over a short range or depth, while a longer duration gain function can provide a coarser resolution over a greater range or depth.

If enhanced performance is desired, i.e., finer resolution and/or longer range or depth, then further received signals modified by further time domain gain functions can be generated and processed to realize the enhanced performance. Furthermore, if noise considerations are a factor, these further signals can be generated in pairs and modified by corresponding pairs of complementary gain functions. To achieve this in the system 1, as before, additional receiver sections like the section 20 can be added or additional pulses can be projected to provide the further received signals.

A particular illustrative example of the above is to use a first set of inverse periodic gain functions at a frequency $f_1$ for the functions $g_1(t)$ and $g_2(t)$ to develop a first set of optical signals $S'_{1,T}$, $S'_{2,T}$ and to use a second set of inverse periodic gain functions $g_3(t)$ and $g_4(t)$ at a second frequency $f_2$ to develop a second set of optical signals $S'_{3,T}$, $S'_{4,T}$. By selecting $f_1 = m\ f_o$ and $f_2 = nf_o$, where m and n are integers with no common factors, it can be shown that the total number of individually resolvable ranges realizable from these two sets of signals approaches the product of the number of ranges resolvable using each set of signals individually.

Figure 4A:
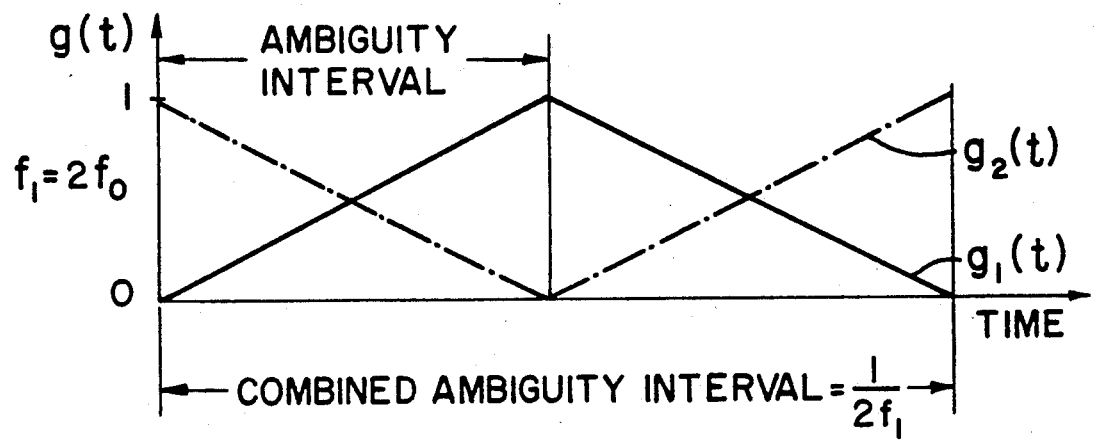
FIGS. 4A and 4B illustrate sets of periodic waveforms which can be used to provide time dependent gain functions in the system of FIG. 1.
Figure 4B:
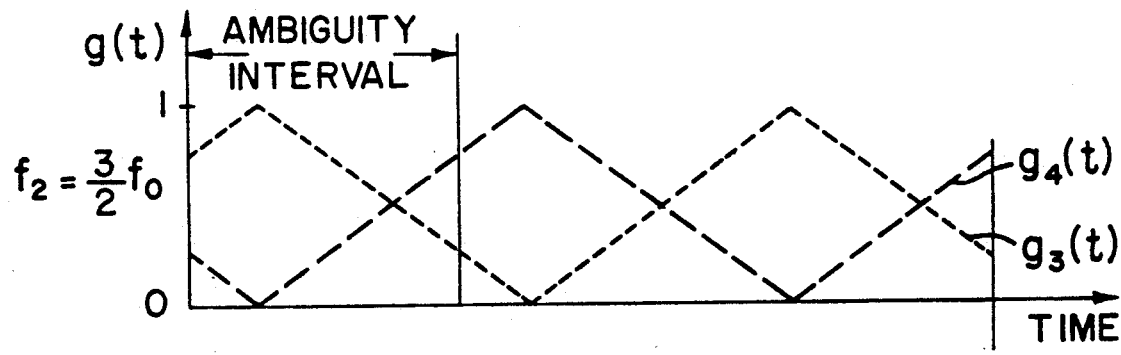

FIG. 4A illustrates two inverse periodic ramp gain functions which can be used as functions $g_1(t)$ and $g_2(t)$ for developing the received optical signals $S'_{1,T}$, $S'_{2,T}$ and FIG. 4B illustrates two higher frequency inverse periodic ramp gain functions which can be used as functions $g_3(t)$ and $g_4(t)$ to develop the optical signals $S'_{3,T}$, $S'_{4,T}$. As shown, the frequency of the functions $g_1(t)$ and $g_2(t)$ is $f_1 = 2f_o$ of and the frequency of the functions $g_3(t)$ and $g_4(t)$ is $f_2 = 3f_o$. As can be seen, the combination of these signals results in a combined ambiguity interval equal to $\frac{1}{6}f_o$, which is larger than the respective ambiguity intervals of each of the signals separately. As a result, the combined signals will provide unambiguous time delay information over a large number of time delay intervals and, hence, over a larger number of range intervals than either of pair of signals separately.

As above-noted, by providing for still further additional received optical signals (via, for example, additional receivers and/or additional projected pulses), the above procedure can be expanded to achieve yet finer resolution or resolution over larger depths. As also above-indicated, the further received signals need not always be used in pairs, particularly if noise considerations are not present. In such case, the energy content of the received signals can be first derived from the signals $S'_{1,T}$ and $S'_{2,T}$, allowing the time delay to be determined from any of the further one or more received signals being used.

In designing the system 1, various equipment configurations can be used to provide the optical amplifier 22. Thus, the amplifier might comprise a constant gain amplifier in front or back of which is situated a variable optical antenuator whose attenuation is controlled by the time dependent gain function being used. Alternatively, the amplifier 22 can be formed by an optical to electrical transducer in which the time dependent gain function is applied to the resultant electrical signal which is then converted back to an optical signal for application to the detector array 24. Also, in the latter case, the electrical signal need not be converted back to an optical signal, but can be applied directly or via an amplifier to the array. An example of an optical to electrical transducer is a photocathode that converts incident photons to electrons. The time dependent gain can be realized with such a transducer using an electrical field that accelerates electrons to an anode or by electron amplication means such as a microchannel plate.

The detector array 24 of the receiver 20 ca be formed as a charge coupled device array. It can also be formed as a charge injection device array.

As above-indicated, the system 1 utilizes a short duration optical pulse as the projected optical signal. A typical range for the pulse duration might be 50-5000 psec.

Figure 5:
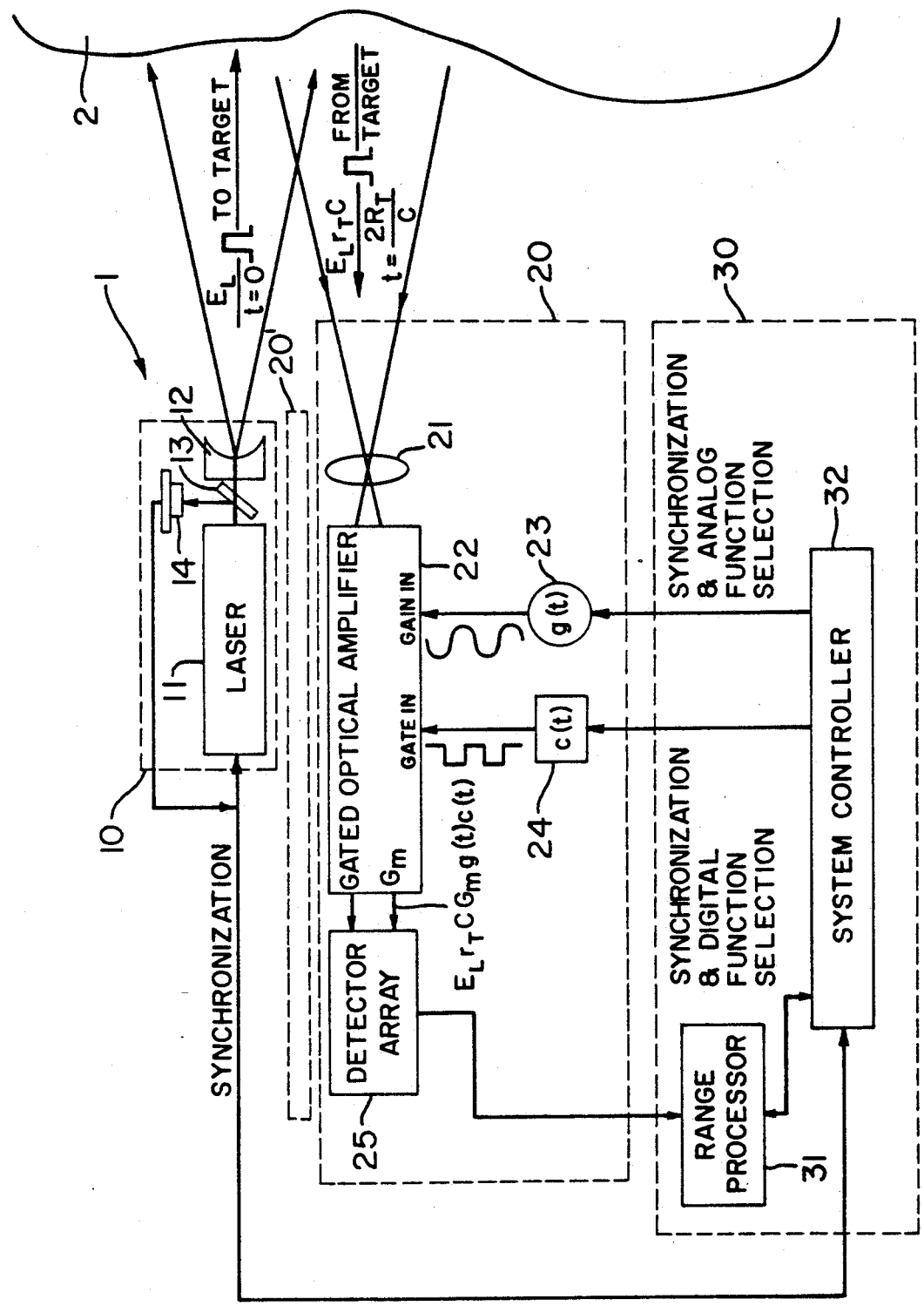
FIG. 5 shows a modified version of the system of FIG. 1.

FIG. 5 shows a modified embodiment of the system 1 of FIG. 1 in which the amplifier 22 of the receiver section 20 has been modified such as to provide not only time dependent gain function modification of the received optical signal $S_T$, but in addition a time dependent gating function like that described in the '253 patent. To achieve this a gating signal generator 24, which is also controlled by the system controller 32, provides selected gating signals C(t) to the amplifier 22, the gating signals likewise being synchronized by the controller 32 with the projected pulses from the unit 10.

Figure 6:
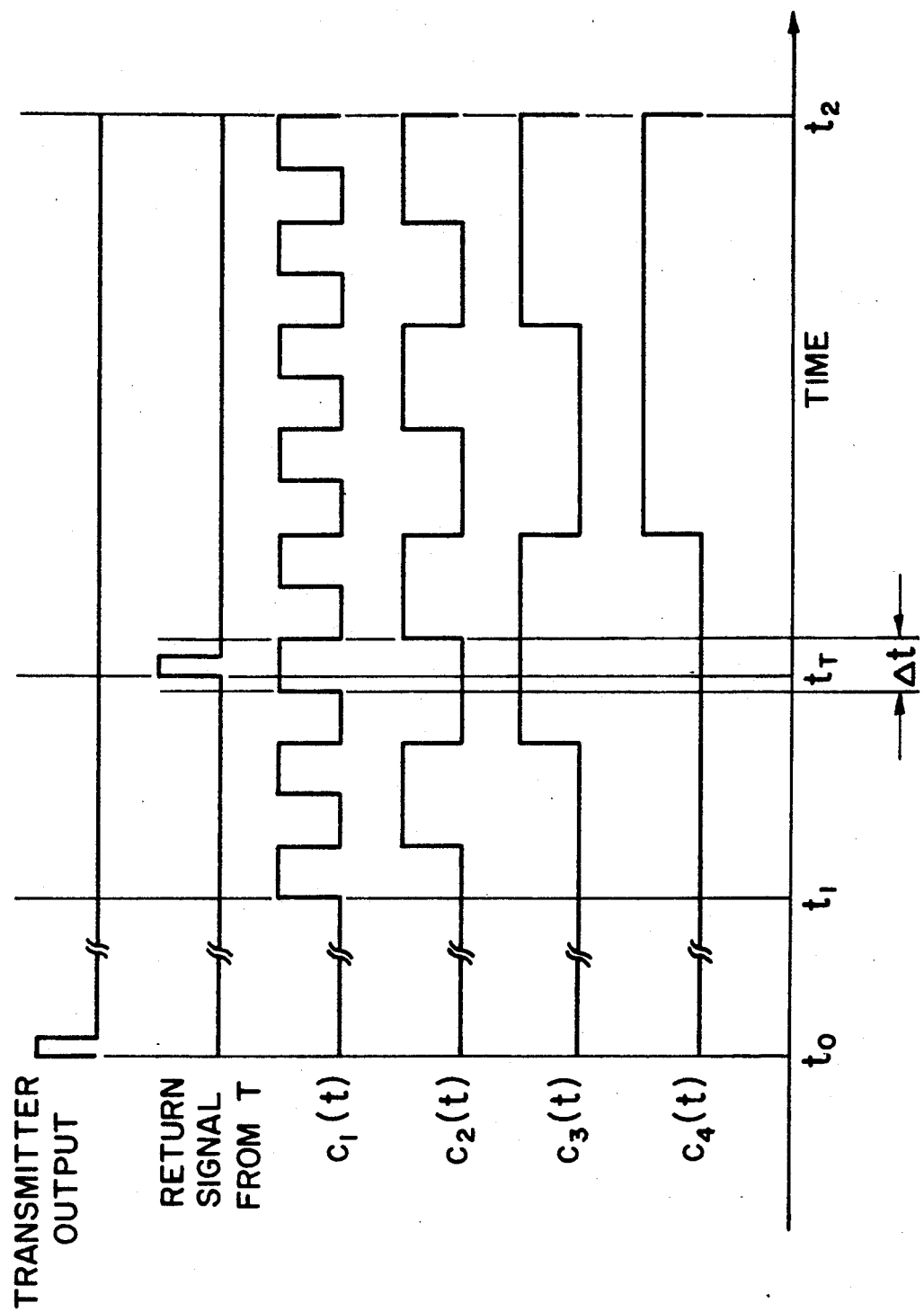
FIG. 6 shows digital waveforms which can be used to provide time gating functions in the system of FIG. 5.

The modified system 1 of FIG. 5 thus now also permits the time delay $t_T$ of a received optical signal $S_T$ to be determined digitally using multiple gating functions, such as the gating functions $C_1(t)$ to $C_4(t)$ shown in FIG. 6. Specifically, this may be accomplished by using these gating signals to gate respective parallel receiver sections 20', which sections have been modified like the receiver section 20 and which receive the optical signal $S_T$ developed by a single projected pulse. Alternatively, the gating signals may be used with the single receiver 20 to gate successively received optical signals $S_T$ developed from successively projected pulses.

In each case, the energy in the gated received optical signals $S''_T$ would be passed from the respective detector array 24 and be processed in the range processor 31, similarly to the processing described in the '253 patent. This would result in the determination of the time delays $t_T$ for the different energy parts in each received signal $S''_T$ and from these delays the ranges of the associated target surface points. Again, this information can be further conventionally processed in the processor 31 to provide the three dimensional location of such target points.

As an example of the above digital processing, looking at FIG. 6, if a particular energy part is received at the receiver 20 at the delay time $t_T$, it will provide a signal at the receiver only during the gating intervals of the gating signals $C_1(t)$ and $C_3(t)$. This combination is thus unique to the delay time $t_T$. Thus, the range processor 31 analyzes each optical signal part to determine the combination of gating signals in which the optical signal part appears. This combination, in turn, corresponds to a specific time delay $t_T$. The latter, in turn, is a measure of the corresponding range value for the associated target surface point.

In the illustration in FIG. 6, the highest fundamental frequency $f_{max}$ of the gating waveforms shown is $f_{max} = \frac{1}{2}\Delta t$. If it is desired to minimize $f_{max}$ in order to simplify the electronic drive circuitry required, this can be accomplished by using a Gray code.

Figure 7:
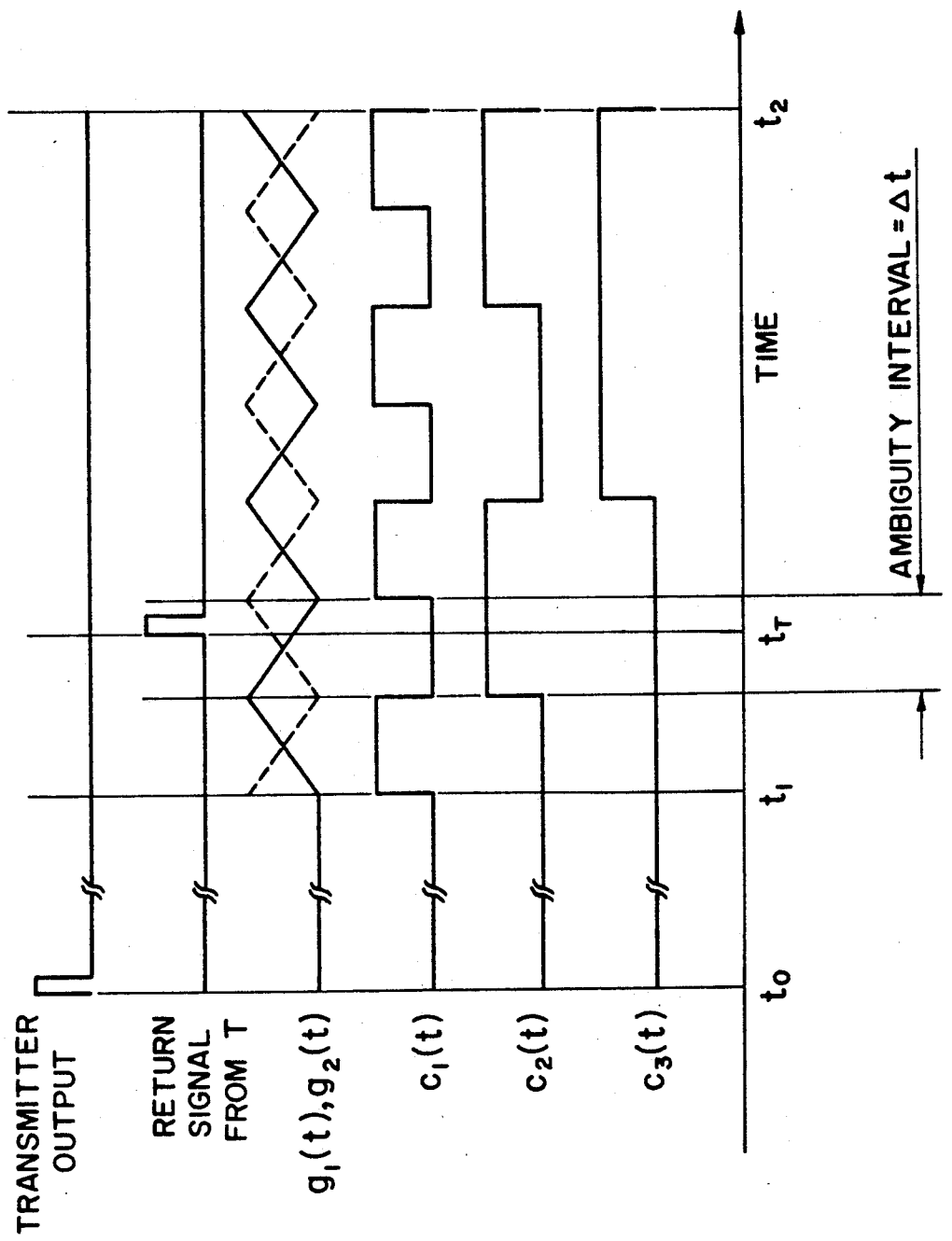
FIGS. 7 and 8 show combined sets of periodic and digital waveforms which can be used to provide time dependent gain functions and time dependent gating functions in the system of FIG. 5.
Figure 8:
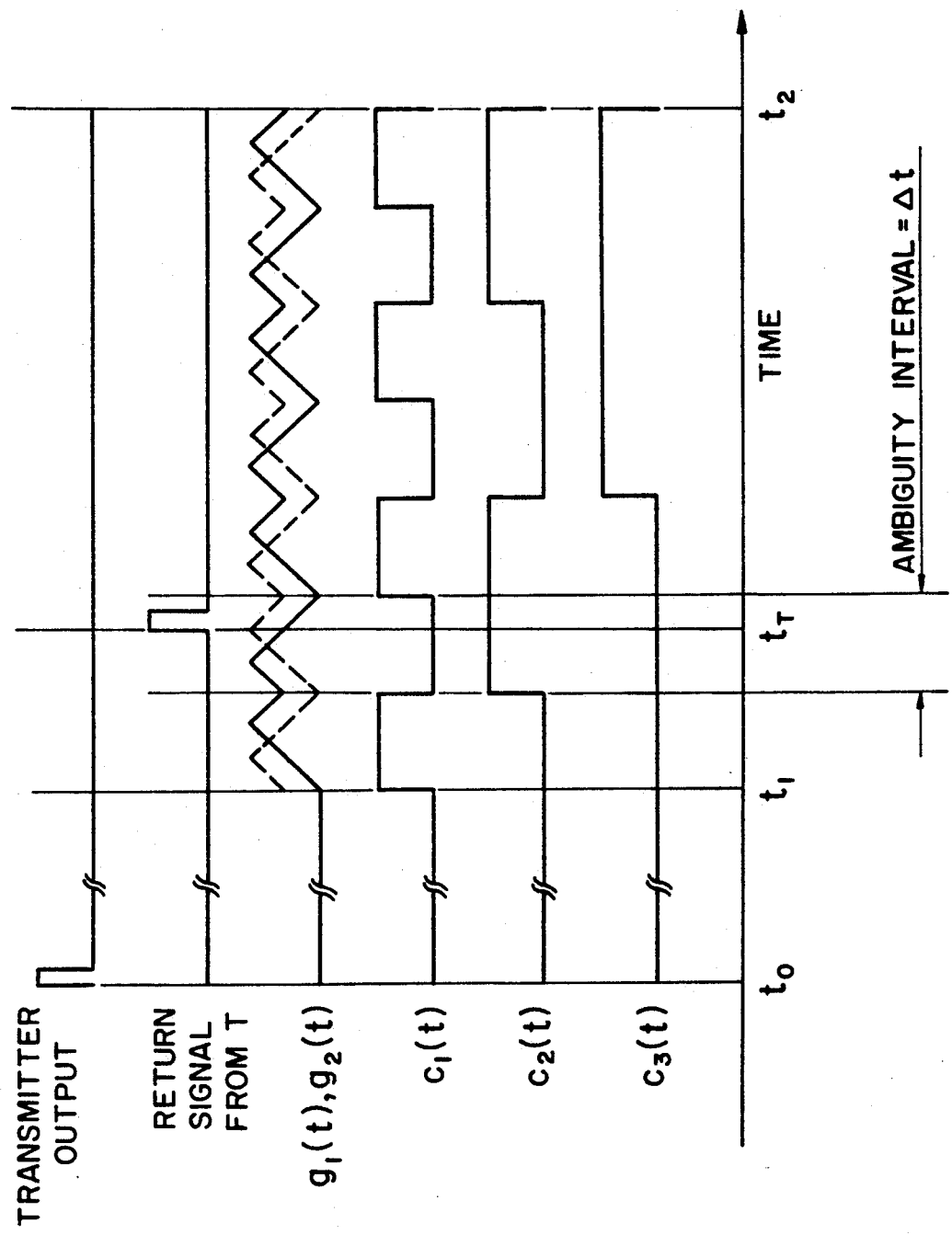

In operation of the system of FIG. 5, the gating functions and associated digital processing are preferably used to develop coarse range resolution and surface point location, thus making the range measurements less dependent on signal to noise factors. The time dependent gain functions and associated analog processing, in turn, are used to provide finer range resolution and object point location, which are more difficult to realize with the digital processing. In order to provide finer resolution without ambiguity, however, the time dependent gain functions used should have an ambiguity interval equal to or larger than the resolution limit $\Delta t$ of the gating waveforms. This is illustrated in the combined waveforms shown in FIGS. 7 and 8.

Figure 9:
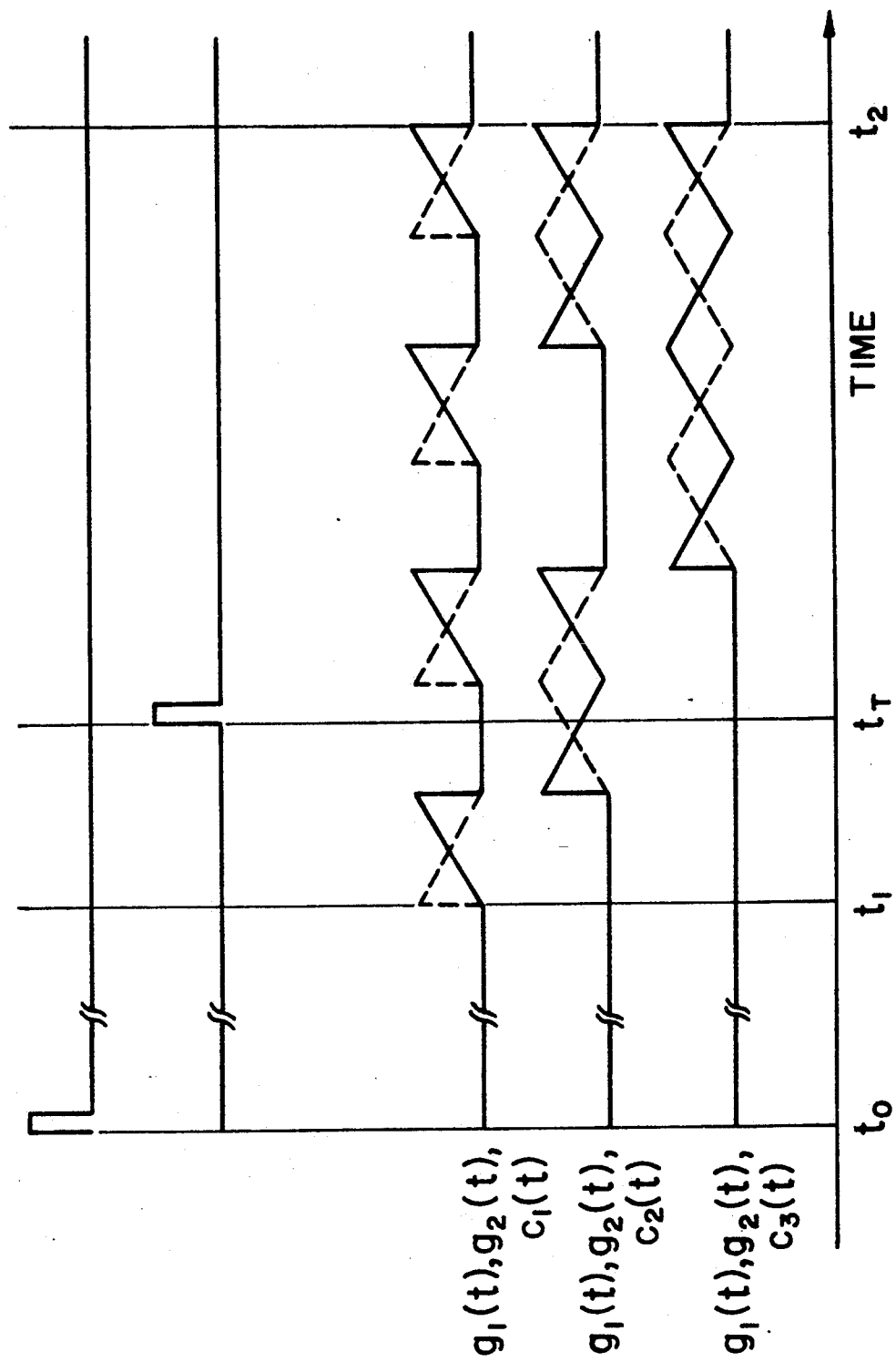
FIG. 9 shows composite waveforms which can be used to provide combined time dependent gain and gating functions for the system of FIG. 5.

While the above description of the modified system of FIG. 5 has been in terms of separate application of the analog and digital processing via separately applied time dependent gain functions and time dependent gating functions, respectively, it is readily apparent that the gating and gain functions can be selectively combined so that both analog and digital processing can be carried out with the same received signals. In such case, the received optical signals modified by the combined gain and gating functions would be analog and digitally processed, as above-described, to derive the desired time delay and range information. FIG. 9 illustrates a combination of the gating and gain functions of FIG. 7 which can be used in this manner.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, for example, other functions, such as sine and cosine functions, inverse sinusoidal pairs or combinations of functions can be used for the time dependent gain functions g(t) discussed above.

What is claimed is:

1. Apparatus for use in determining the spatial location of the points on an object surface in response to projection of a first short pulse of optical energy at said object surface, said apparatus comprising:
   means for receiving first optical energy reflected by said object surface as a result of said projected first short pulse of optical energy;
   means for modifying said received first optical energy by a first time dependent gain function, said first time dependent gain function undergoing a change during the time of occurrence said first time dependent gain function;
   and means for processing said modified received first optical energy to determine a measure of the gain modification made to individual parts of said modified received first optical energy for use in determining the location of the surface points corresponding to said individual parts of said modified received first optical energy.

2. Apparatus in accordance with claim 1 wherein:
   said processing means includes means for converting said individual parts of said modified received first optical energy into corresponding electrical signals.

3. Apparatus in accordance with claim 2 wherein:
   said processing means further includes: means for analyzing each of said electrical signals to determine a measure of the gain factor modification made to its respective individual part of said modified received first optical energy, said gain factor modification being a measure of the time delay of receipt by said receiving means of said individual part of said modified received first optical energy and of the range dimension of the associated object surface point.

4. Apparatus in accordance with claim 3 wherein:
   said converting means includes a detector array.

5. Apparatus in accordance with claim 4 wherein:
   said detector array includes one of a charge-coupled device array and a charge-injection device array.

6. Apparatus in accordance with claim 3 wherein:
   said means for modifying includes: one of an optical amplifier and a transducer for amplifying said received reflected first optical energy in accordance with said first time dependent gain function; and function generator means for generating said first first time dependent gain function and providing said time dependent function to one of said optical amplifier and transducer.

7. Apparatus in accordance with claim 6 wherein:
   said means for modifying includes said optical amplifier and said optical amplifier comprises a microchannel plate image intensifier.

8. Apparatus in accordance with claim 6 wherein:
   said means for modifying includes said optical transducer and said optical transducer includes a photocathode optical to electron transducer.

9. Apparatus in accordance with claim 8 wherein:
   said optical transducer further includes a microchannel plate electron amplifier following such photocathode optical to electron transducer.

10. Apparatus in accordance with claim 3 wherein:
    said means for modifying includes: an optical amplifier having a substantially constant gain for amplifying said received first optical energy; and variable optical attenuator means for attenuating said received first optical energy; said optical amplifier and variable optical attenuator together acting to apply said first time dependent gain function to said received first optical energy.

11. Apparatus in accordance with claim 1 wherein:
    said receiving means includes a first receiving channel for receiving said first optical energy and a plurality of further receiving channels each for receiving further optical energy reflected by said object surface as a result of said first short pulse of optical energy; and
    said modifying means modifies the received further optical energy in a number of said plurality of further receiving channels by different time dependent gain functions, said first receiving channel and number of said plurality of further receiving channels defining a first set of channels;
    and said processing means: further processes the modified received further optical energy in each of said number of said plurality of further receiving channels of said first set of channels to determine a measure of the gain modification made to each of the individual parts of said modified received further optical energy of that further receiving channel; and uses the determined gain modifications for corresponding individual parts of the modified received first and further optical energy of said first set of said channels to determine the spatial location of the point on the object surface associated with said corresponding individual parts.

12. Apparatus in accordance with claim 11 wherein:
    a second time dependent gain function is used by said modifying means for the received further optical energy in one of said number of said plurality of further receiving channels of said first set of channels.

13. Apparatus in accordance with claim 13 wherein:
    said first and second time dependent gain functions are inverse functions.

14. Apparatus in accordance with claim 13 wherein:
    said first and second time dependent gain functions are each linear functions.

15. Apparatus in accordance with claim 14 wherein:
    said linear functions are ramp functions.

16. Apparatus in accordance with claim 12 wherein:
    said second time dependent gain function is substantially constant in gain over a given time period.

17. Apparatus accordance with claim 16 wherein:

said first time dependent gain function is a ramp function over said given time period.

18. Apparatus in accordance with claim 11 further comprising:
gating means for gating said receiving means so that said receiving means is able to receive optical energy in a second set of said receiving channels in accordance with a plurality of different time dependent gating functions.

19. Apparatus in accordance with claim 18 wherein: said processing means further uses said gated received optical energy in said second set of channels to determine the location of said object surface points.

20. Apparatus in accordance with claim 19 wherein: said first set of channels and said second set of channels have one or more channels in common.

21. Apparatus in accordance with claim 20 wherein: the time dependent gating function and the time dependent gain function used in a common channel are combined into a common function.

22. Apparatus in accordance with claim 1 wherein: said apparatus is further responsive to projection of a plurality of further short pulses of optical energy at said object surface;
said receiving means receives a succession of further optical energies reflected by said object surface as a result of said succession of projected further short pulses of optical energy;
said modifying means modifies a number of said succession of received further optical energies by different time dependent gain functions, said received first optical energy and said number of said succession of received further optical energies defining a first set of received optical energies:
and said processing means; further processes each of said number of said succession of received further optical energies of said first set of received optical energies to determine a measure of the gain modification made to each of the individual parts of each of said received further optical energies of said first set of received optical energies; and uses the determined gain modifications for corresponding individual parts of said received first and further optical energies of said first set of received optical energies in determining the spatial location of the point on the object surface associated with said corresponding individual parts.

23. Apparatus in accordance with claim 22 wherein: a second time dependent gain function is used by said modifying means for one of said number of said succession of received further optical energies in said first set of received optical energies.

24. Apparatus in accordance with claim 23 wherein: said first and second time dependent gain functions are inverse functions.

25. Apparatus in accordance with claim 24 wherein: said first and second time dependent gain functions are each linear functions.

26. Apparatus in accordance with claim 25 wherein: said linear functions are ramp functions.

27. Apparatus in accordance with claim 22 wherein: said second time dependent gain function is substantially constant in gain over a given time period.

28. Apparatus in accordance with claim 27 wherein: said first time dependent gain function is a ramp function over said given time period.

29. Apparatus in accordance with claim 22 further comprising:
gating means for gating said receiving means so that said receiving means is able to receive optical energies in a second set of received optical energies in accordance with a plurality.

30. Apparatus in accordance with claim 29 wherein: said processing means further uses said gated received optical energies in said second set of said received optical energies in determining the location of said object surface points.

31. Apparatus in accordance with claim 30 wherein: said first and second sets of received optical energies have one or more of said received optical energies in common.

32. Apparatus in accordance with claim 31 wherein: the time dependent gain function and the time dependent gating function applied to a common received optical energy are combined into a common function.

33. Apparatus in accordance with claim 1 wherein: said means for modifying said received first optical energy modifies said received first optical energy by a time dependent gating function;
and said means for processing determines for each individual part of the modified received first optical energy whether it is present or absent during said gating function and uses this information in determining the location of the surface point corresponding to the individual part.

34. Apparatus in accordance with claim 33 wherein: said time dependent gain and gating functions are combined into a composite function.

35. A method for use in determining the spatial location of the points on an object surface in response to projection of a first short pulse of optical energy at said object surface, said method comprising;
receiving fist optical energy reflected by said object surface as a result of said projected first short pulse of optical energy;
modifying said received first optical energy by a first time dependent gain function, said first time dependent gain function undergoing a change during the time of occurrence of said first time dependent gain function;
and processing said modified received first optical energy to determine a measure of the gain modification made to individual parts of said modified received first optical energy for use in determining the location of the surface points corresponding to said individual parts of said modified received first optical energy.

36. A method in accordance with claim 35 wherein: said processing includes converting said individual parts of said modified received first optical energy into corresponding electrical signals.

37. A method in accordance with claim 36 wherein: said processing further includes: analyzing each of said electrical signals to determine a measure of the gain factor modification made to its respective individual part of said modified received first optical energy, said gain factor modification being a measure of the time delay of receipt of said individual part of said modified received first optical energy and of the range dimension of the associated object surface point.

38. A method in accordance with claim 35 wherein:

said step of receiving includes receiving in a first receiving channel said first optical energy and in a plurality of further receiving channels further optical energy reflected by said object surface as a result of said first pulse of optical energy; and said step of modifying includes modifying the received further optical energy in a number of said plurality of further receiving channels by different time dependent gain functions, said first receiving channel and number of said plurality of further receiving channels defining a first set of channels;

and said processing step includes: further processing the modified received further optical energy in each of said number of said plurality of further receiving channels of said first set to determine a measure of the gain modification made to each of the individual parts of said modified received optical energy of that further receiving channel; and using the determined gain modifications for corresponding individual parts of the modified received first and further optical energy of said first set of said channels to determine the spatial location of the point on the object surface associated with said corresponding individual parts.

39. A method in accordance with claim 38 wherein: a second time dependent gain function is used to modify the received further optical energy in one of said number of said plurality of further receiving channels of said first set of channels.

40. A method in accordance with claim 39 wherein: said first and second time dependent gain functions are inverse functions.

41. A method in accordance with claim 40 wherein: said first and second time dependent gain functions are each linear functions.

42. A method in accordance with claim 41 wherein: said linear functions are ramp functions.

43. A method in accordance with claim 39 wherein: said second time dependent gain function is substantially constant in gain over a given time period; and said first time dependent gain function is a ramp function over said given time period.

44. A method in accordance with claim 38 further comprising:
gating optical energy received in a second set of said receiving channels in accordance with a plurality of different time dependent gating functions.

45. A method in accordance with claim 44 wherein: said processing further includes using said gated received optical energy in said second set of channels to determine the location of said object surface points.

46. A method in accordance with claim 45 wherein: said first set of channels and said second set of channels have one or more channels in common;
and the time dependent gating function and the time dependent gain function used in a common channel are combined into a common function.

47. A method in accordance with claim 35 wherein: said receiving step includes receiving a succession of further optical energies reflected by said object surface as a result of a succession of projected further short pulses of optical energy;
said modifying step includes modifying a number of said succession of received further optical energies by different time dependant gain functions, said received first optical energy and said number of said succession of received further optical energies defining a first set of received optical energies;

and said processing step includes: further processing each of said number of said succession of received further optical energies of said first set of received optical energies to determine a measure of the gain modification made to each of the individual parts of each of said received further optical energies of said first set of received optical energies; and using the determined gain modifications for corresponding individual parts of said received first and further optical energies of said first set of received optical energies in determining the spatial location of the point on the object surface associated with said corresponding individual parts.

48. A method in accordance with claim 47 wherein: a second time dependent gain function is used to modify one of said number of said succession of received optical energies in said first set of received optical energies.

49. A method in accordance with claim 48 wherein: said first and second time dependent gain functions are inverse functions.

50. A method in accordance with claim 49 wherein: said first and second time dependent gain functions are each linear functions.

51. A method in accordance with claim 50 wherein: said linear functions are ramp functions.

52. A method in accordance with claim 48 wherein: said second time dependent gain function is substantially constant in gain over a given time period; and said first time dependent gain function is a ramp function over said given time period.

53. A method in accordance with claim 47 further comprising:
gating received optical energies in a second set of received optical energies in accordance with a plurality of different time dependent gating functions.

54. A method in accordance with claim 53 wherein: said processing further uses said gated received optical energies in said second set of said received optical energies in determining the location of said object surface points.

55. A method in accordance with claim 54 wherein: said first and second sets of said succession of received optical energies have one or more of said received optical energies in common;
and the time dependent gain function and the time dependent gating function applied to a common received optical energy are combined into a common function.

56. A method in accordance with claim 35 wherein: said modifying step includes modifying said received first optical energy by a time dependant gating function;
and said processing includes: determining for each individual part of the modified received first optical energy whether it is present or absent during said gating function; and using this information in determining the location of the surface point corresponding to the individual part.

57. A method in accordance with claim 56 wherein: said time dependent gain and gating functions are combined into a composite function.

* * * * *

UNITED STATES PATENT AND TRADEMARK OFFICE
CERTIFICATE OF CORRECTION

PATENT NO. : 5,216,259
DATED : June 1, 1993
INVENTOR(S) : Howard K. Stern and Stanley Elstein It is certified that error appears in the above-identified patent and that said Letters Patent is hereby corrected as shown below:

Col. 3, line 5.   Change "g in" to -- gain --
Col. 6, line 12.  Delete "the" first occurrence
Col. 7, line 20.  Delete "of"
Col. 7, line 60.  Change "ca" to -- can --
Col. 9, line 67.  Delete "first"
Col. 10, line 1.  After "said" insert -- first --
and after "dependent" insert -- gain --
Col. 10, line 68. After "apparatus" insert -- in --
Col. 12, line 7.  After "plurality" insert -- of time dependent gating functions. --
Col. 13, line 66. Change "dependant" to -- dependent --

Signed and Sealed this

Twenty-second Day of March, 1994

Attest:

BRUCE LEHMAN

*Attesting Officer*    Commissioner of Patents and Trademarks